United States Patent
Rinne et al.

(10) Patent No.: US 6,711,141 B1
(45) Date of Patent: Mar. 23, 2004

(54) CONTROLLING PDP CONTEXTS IN MOBILE STATIONS

(75) Inventors: Janne Petri Rinne, Tampere (FI); Jan Erik Suumäki, Tampere (FI); Juha Mikael Kalliokulju, Vesilahti (FI); Matti Tapio Turunen, Tampere (FI); Jarkko Juhani Jouppi, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 765 days.

(21) Appl. No.: 09/587,313

(22) Filed: Jun. 5, 2000

(30) Foreign Application Priority Data

Jun. 7, 1999 (FI) .................................................. 991300

(51) Int. Cl.[7] .............................................. H04L 12/56
(52) U.S. Cl. ...................................... 370/328; 370/338
(58) Field of Search ................................. 370/338, 349, 370/395.52, 328, 389

(56) References Cited

U.S. PATENT DOCUMENTS 6,469,998 B1 * 10/2002 Salinas et al. ............... 370/338

6,608,832 B2 * 8/2003 Forslow ...................... 370/353

FOREIGN PATENT DOCUMENTS

| WO | WO 98/53576 | 11/1998 |
|---|---|---|
| WO | WO 99/05828 | 2/1999 |
| WO | WO 99/39480 | 8/1999 |
| WO | WO 99/48310 | 9/1999 |

OTHER PUBLICATIONS

Finnish Patent Application No. 990009, "Transporting Qos Mapping Information In a Packet Radio Network".

* cited by examiner

Primary Examiner—Kenneth Vanderpuye
(74) Attorney, Agent, or Firm—Perman & Green, LLP

(57) ABSTRACT

A method to control the PDP context of a data packet and a mobile station to realise the method. The mobile station comprises a control element, which controls the classification of a data packet to be sent to a PDP context on basis of a first and a second identifier. The first identifier indicates the application that has created the data packet and the second identifier indicates a separate data flow of the application. The classification process is simplified and thus better suited to a mobile station with limited performance capacity.

10 Claims, 4 Drawing Sheets

CONTROLLING PDP CONTEXTS IN MOBILE STATIONS

FIELD OF THE INVENTION

The present invention relates to data transfer and specifically a method to direct the PDP context of a data packet in a mobile station containing one or several applications that perform packet format data transfer. The present invention also targets a mobile station realising the method.

BACKGROUND OF THE INVENTION

A WCDMA (Wideband Code Division Multiple Access) air interface being defined and the new radio network services it has generated along with the evolution of GSM/GPRS (Global System for Mobile Telecommunications/General Packet Radio System) based trunk line give a starting point to a third generation evolved packet format data transfer. The architecture of a new packet switched data transfer recognises the division between circuit and packet switched data transfer present in conjunction with GSM/GPRS and, being identical to GPRS core network in many parts, enables co-operation between second and third generation packet switched data transfer.

Even though the available bandwidth in new third generation systems will be larger that earlier, the radio interface will continue to be the bottleneck of the system. New packet switched data transfer networks have to support many uses requiring many different levels of resources, e.g. real time video conferencing services on one hand and background file transfer on the other hand. To improve the use of limited resources solutions must be developed to control the use of a radio resource according to the needs of the current use.

With the increase in packet format data transfer the border between traditional telecommunication and data communication along with the border between applications used with a wireless connection and a wired network is being blurred. In order to guarantee a user base as large as possible it is very desirable that applications be independent of the selected environment. Since new services are, at least for now, being created more on the wired network side, an as good as possible adaptability of these applications to especially wireless connections is an important design principle.

In the UMTS (Universal Mobile Telecommunications System) system being defined, which system is based on the third generation WCDMA radio interface, the initiation of a connection essentially contains the activation of a PDP (Packet Data Protocol, PDP) context. A PDP context is equivalent to allocating of a PDP address and initiating a logical contact conforming to a certain quality of service through an UMTS network. The quality of service (QoS) is defined by a group of QoS parameters defining the quality of service, which parameters include e.g. delay, BER (Bit Error Rate), maximum bit rate and order of service. Thus the requested and negotiated QoS parameters of one PDP context form one QoS profile.

Already in second generation GPRS system it has been possible to define a different PDP context to each application according to the PDP address. For this functionality a reference is made to the Finnish patent application F1990009, applied by Nokia Telecommunications. Since the application is still classified, the subject is presented in essential parts also in this application. For example, the defined PDP addresses can pertain to e-mail applications, where response times are not a critical factor and correspondingly the interactive applications linked to other PDP addresses do not tolerate delay and thus demand quick pass through times. To realise these differences also in more evolved packet radio networks, a suggestion has been made to describe the packets of each application into a suitable PDP context using filters. A filter is preferably a piece of information transmitted between the edge elements of a packet radio network in conjunction with the modification or activation of a PDP context, which information consists of a group of pre-defined parameters or conditions, with the aid of which said edge element can recognise data packets pertaining to a certain application and thus describe said packets directly into the desired PDP context. In uplink data transfer the description is realised in the terminal of the user and in downlink data transfer the description is realised in a gateway GPRS support node GGSN. However, in IP (Internet Protocol) connections this means that an application attached to a certain PDP address can use only one QoS profile. As services continue to grow more versatile combinations of sound, image and data this is an awkward limitation, which hopefully will be eliminated in conjunction with UMTS evolution.

In a GPRS connection, then, a minimum filter can be a PDP address. In UMTS environment and possibly in future GPRS versions the filter must, in order to support several PDP contexts, typically contain information on at least the TCP/UDP (Transport Control Protocol/User Datagram Protocol) ports, source IP address and target IP address. The information on TCP/UDP ports is located in TCP/UDP headers which is contained in the data part of an IP packet. On the user's terminal the classification to different PDP contexts is typically and preferably done under the IP layer, which means that receiving the data needed for classification requires, in addition to a layer breach, extra processing in the terminal, as the IP packet must be deconstructed in order to find out the filter data needed. In wireless terminals the performance of the processor is limited, so an increase in the steps taken to process packets is very undesirable; the classification of data packets in the terminal should indeed be realised as effectively as possible and in a manner as easy as possible. Additionally, when using the IPSEC (IP Security) function, the data inside an IP data unit and thus also the information about TCP/UDP ports in the TCP header is encrypted. In this case classification of the data packets in the terminal becomes more difficult, since even packets belonging to different applications cannot be distinguished by a mere IP address.

SUMMARY OF THE INVENTION

Now a method and means realising the method have been invented to solve the problems presented above in order to direct uplink data packets into the desired PDP contexts are solved or at least their effect is essentially decreased. The invention describes a method to direct the PDP context of a data packet in a mobile station containing one or several applications realising packet format data transfer, in which method a data packet is received from an application, which packet contains a first identifier to identify the application that has produced the data packet. The method is characterised in that input piece of information attached to said application is received, which piece of information contains information about one or several separate data flows; a PDP context is defined to each of the data flows of the application on basis of said piece of information; a second identifier identifying the data flow is added to the data packet; and the departing data packet is classified into a PDP context on basis of said first and second identifier.

The present invention also targets a mobile station according to claim 10. Preferable embodiments have been presented in dependent claims.

The gist of the invention is that a control device is added to the terminal, which control device receives input at least at the start of an application, on the basis of which input it defines and realises the PDP context(s) to each data flow of the application. Preferably said control device describes the PDP context of each data flow to a detector in the header of the IP layer, with the aid of which detector the PDP context to be used in the transfer of the data packet can easily and quickly be defined also in a mobile station of limited performance.

In addition to simplifying the classification process the present invention yields other advantages. The control device preferably has several interfaces to different sources of input, which means that possibilities to make definitions are increased and the data to support definitions still has to be updated only to the control unit. With the aid of the control device a mobile station can be adapted to support applications or even application interfaces, which are not necessarily adapted to packet radio network use.

BRIEF DESCRIPTION OF THE DRAWINGS

The present invention is described in detail in the following by referring to the enclosed drawings, where the block diagram of FIG. 1 illustrates the architecture of an UMTS packet radio network;

the block diagram of FIG. 2 illustrates the protocol architecture of a mobile station according to the present invention and presents the new functional elements of the mobile station, which elements are related to the present invention;

Figure 3:
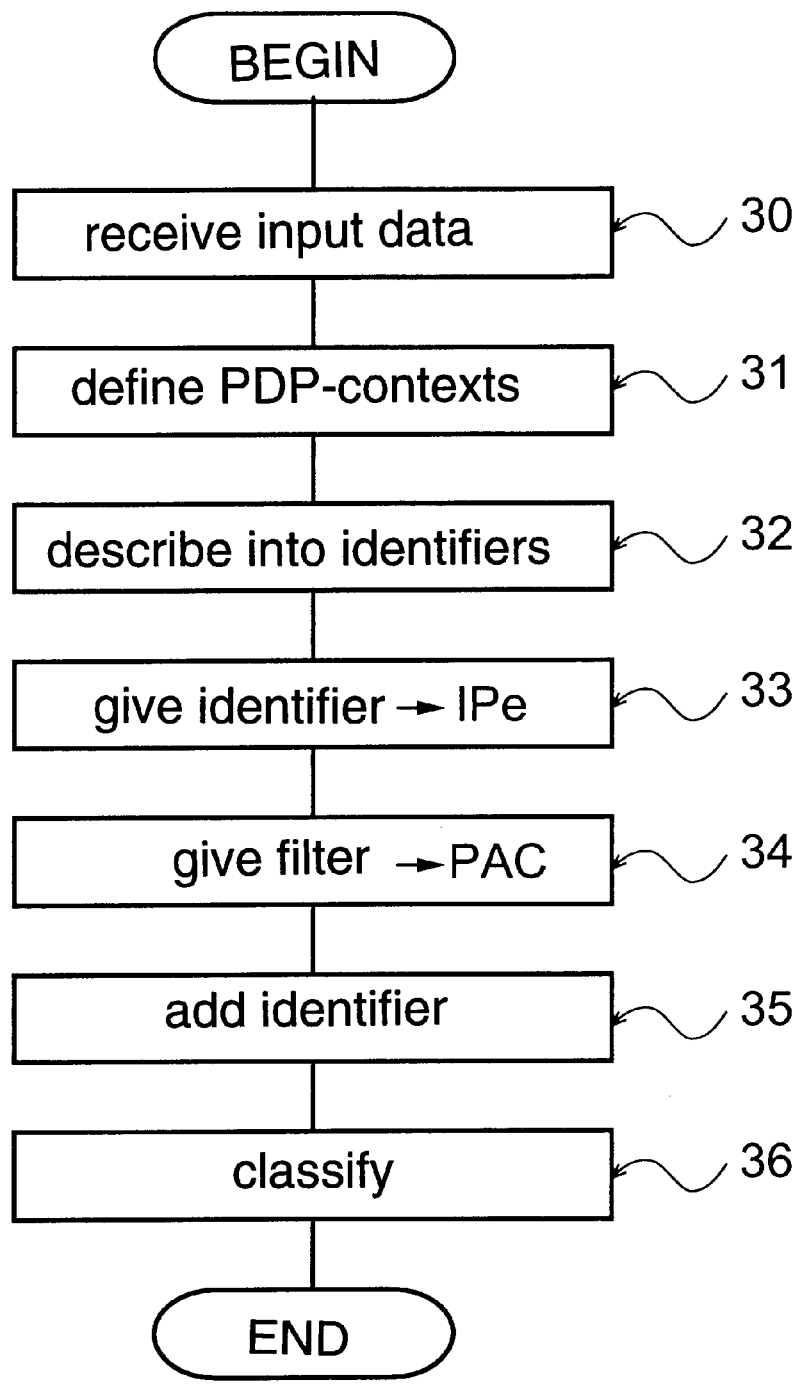
Figure 4:
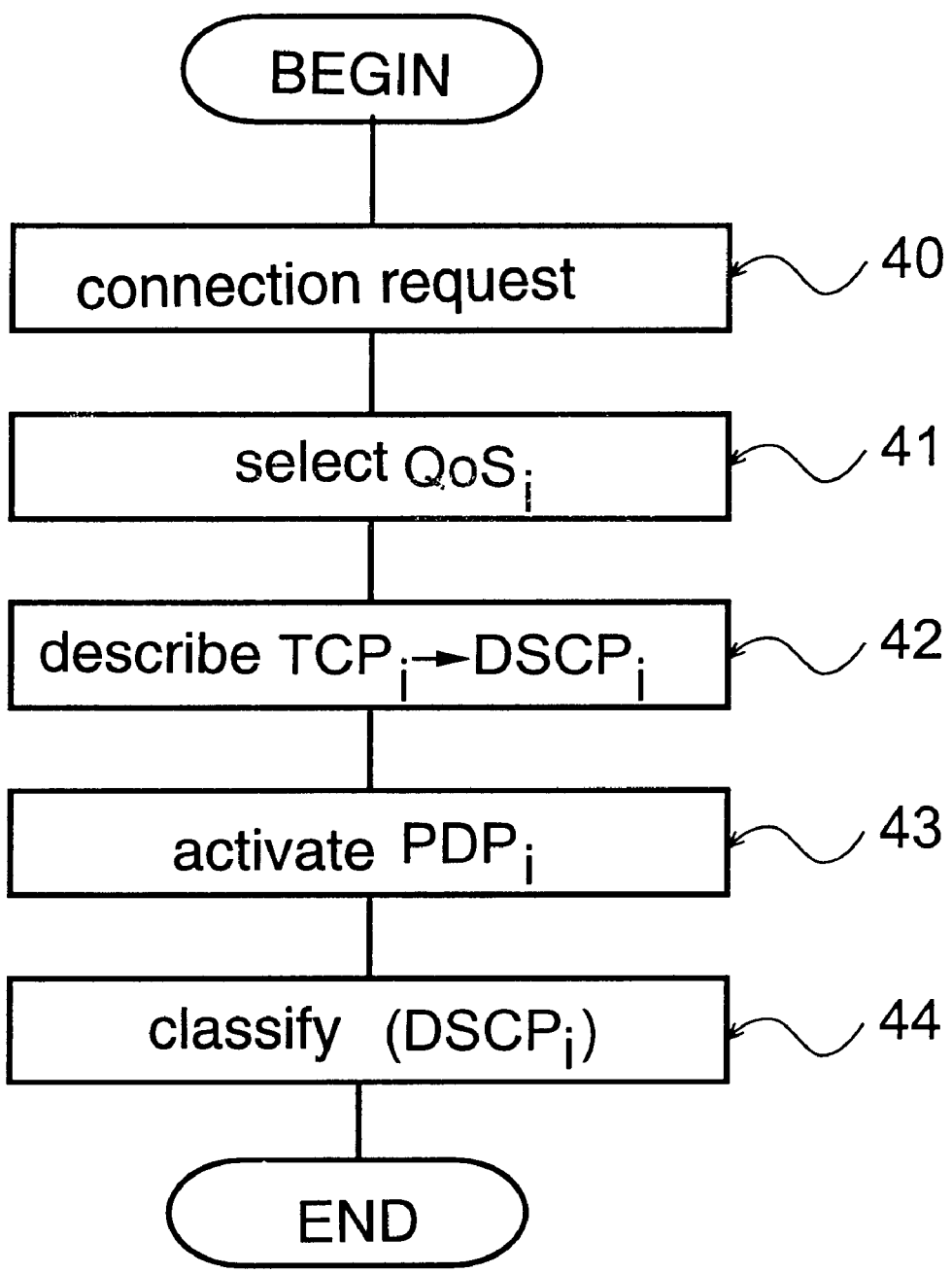

the flow diagram of FIG. 3 illustrates in a general level an embodiment according to the present invention on a mobile station; and the flow diagram of FIG. 4 illustrates a method according to a first embodiment of the present invention to control the sending of a data packet sent from a terminal.

DETAILED DESCRIPTION

Figure 1:
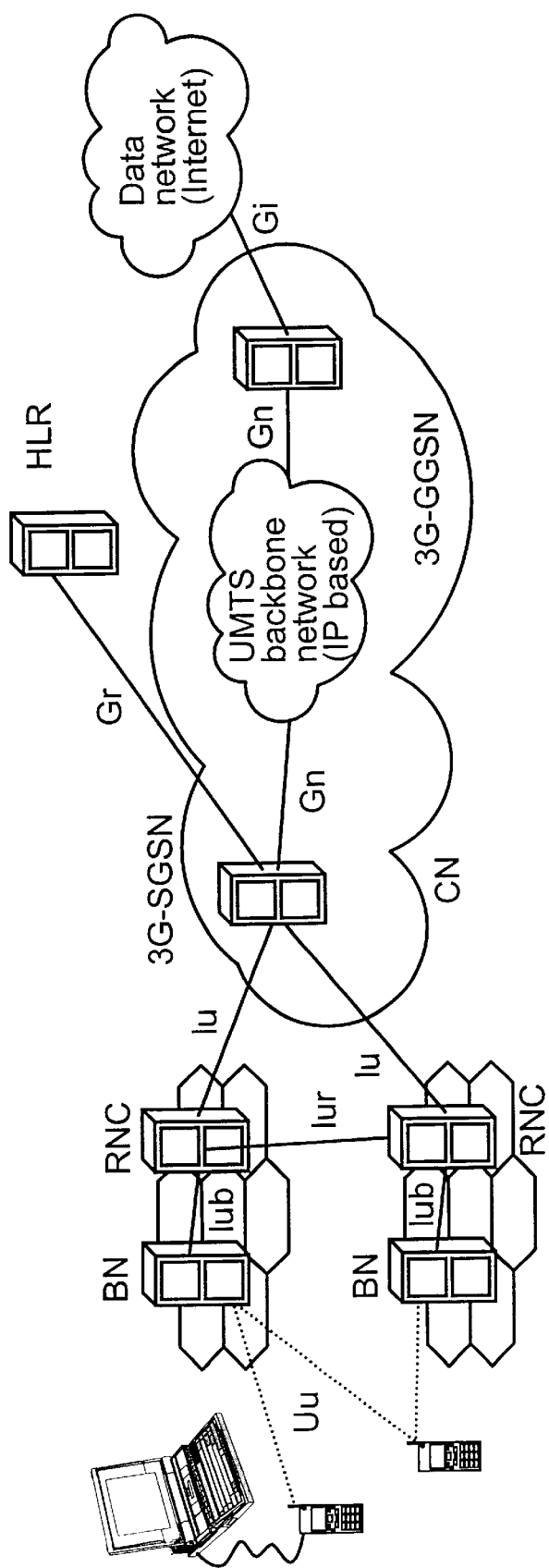

The present invention is described in the following with the aid of an UMTS system, without, however, restricting it to said system and its characteristics. The block diagram in FIG. 1 illustrates the architecture of a UMTS packet radio network now being discussed, which network resembles the GPRS service of the GSM system in many points. It must be noted that the defining work is still underway, so the names of the elements and their functionalities along with the names of the protocols may change in some parts. In an UMTS system mobile stations MS communicate with a radio access network RAN through a radio interface. RAN comprises B nodes BN and radio network controllers RNC which control them. RAN handles the functionalities of the protocol layers of the radio interface. The protocol layers of the radio interface include L3CE (Layer 3 Compatibility Entity), RLC (Radio Link Control), MAC (Medium Access Control) and the physical layer (L1).

The radio network RAN is connected to the trunk line CN through an interface Iu. The serving support node 3G-SGSN identifies and registers mobile stations on its area and transfers data packets between radio network controllers RNC and a gateway node 3G-GGSN. 3G-SGSN takes part in routing data packets and the functionalities of mobility control. 3G-SGSN controls connection management, i.e. on the core network side it is responsible for actions pertaining to setting up a user initiated connection, changing and freeing the connection and initiates the actions pertaining to changes in the connection and freeing the connection on the trunk line side.

The gateway node 3G-GGSN preserves data about the servicing node 3G-SGSN under which the mobile station MS is registered at any given time. The gateway node 3G-GGSN essentially performs the intermediary functions between the UMTS network and an external network such as the Internet. One of these tasks is to describe the definitions pertaining to level of external service into QoS profiles of the UMTS system and vice versa.

Figure 2:
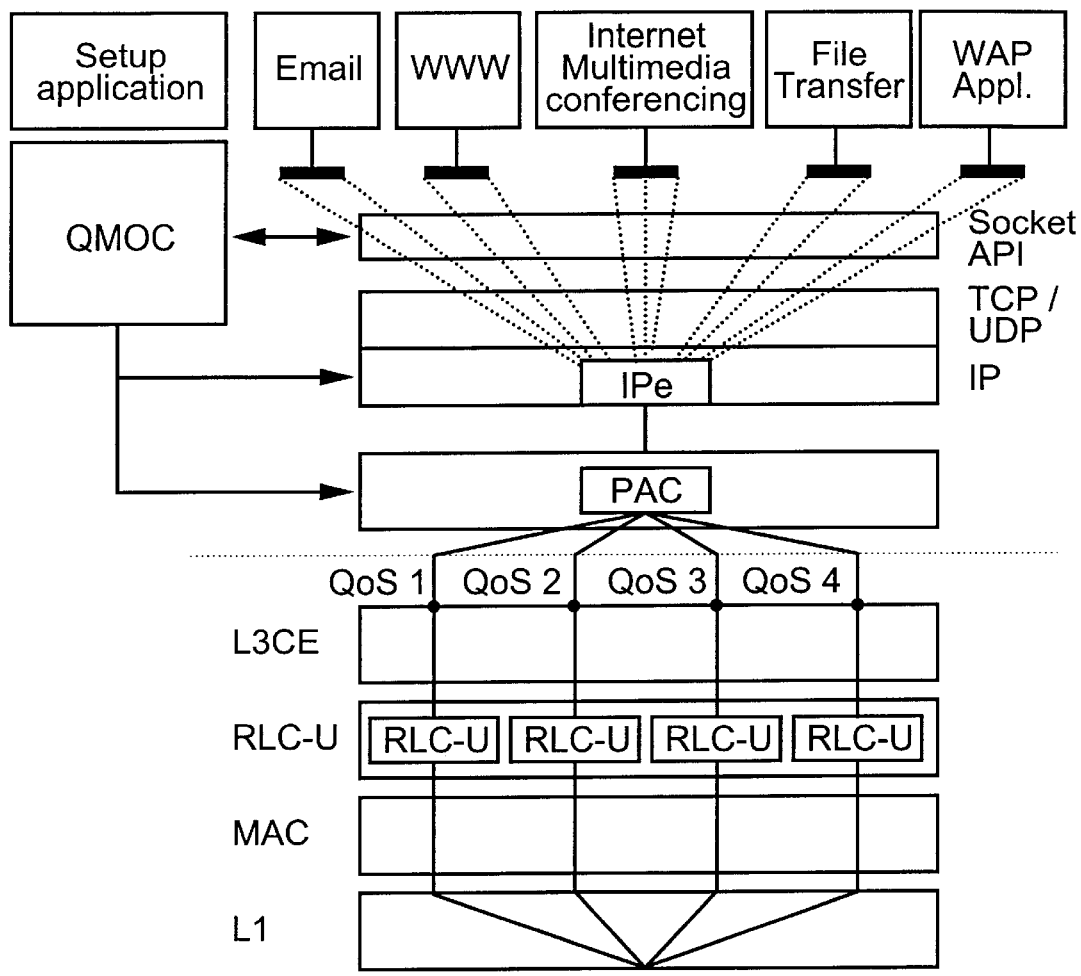

The block diagram in FIG. 2 illustrates the protocol architecture of a mobile station according to the present invention and presents the new functional elements of the mobile station. The protocol stack has been divided into to by a horizontal line: UMTS protocols below the line and external protocols above. The lower level protocols (L3CE, RLC, MAC, L1) belonging to the UMTS protocols perform information transfer through the UMTS network according to the selected QoS profile QoS1, QoS2, QoS3, QoS4. External protocols, such as IP and TCP/UDP are standardised protocols in the world of the Internet, but they have not been widely applied in wireless terminals. The topmost layer is the Socket API (Application Program Interface), which is a programming interface pertaining to use of applications, which interface makes use of the services of the TCP/UDP layer. These higher level protocols do not use UMTS protocols directly, but an adapting functionality of some kind is needed on the mobile station between them and the UMTS layers. Preferably also the Socket API is to the largest possible extent independent of the type of the terminal and/or model of mobile station.

A mobile station according to the present invention comprises a new functional element, the OMOC (Quality Management & Optimization Control) which, at least after the application has started, receives or retrieves the definitions pertaining to the application and on that basis realises the PDP context of the mobile station. In order to receive definitions pertaining to the application the control element QMOC comprises one or several source interfaces for input data. Such sources include, for example:

Socket API, in which case QMOC receives the QoS data and filter data from Socket API, when the data transfer pertaining to the application is initiated. QMOC contains information in order to convert the external definition pertaining to the level of service of the application to a QoS profile of the UMTS system. In this case, preferably no others than the control element QMOC necessarily need to recognise and interpret definitions pertaining to different applications.

User definitions, in which case a connection forming application, such as a user interface, has been integrated in the mobile station. Said connection forming application gives the user an interface to the control element, in which case the user can give definitions about the data transfer of different applications as needed. Since the price of the connection greatly depends on the resource used, this is an important characteristic.

Internal definitions, in which case the manufacturer of the mobile station, in conjunction with the manufacturing of the mobile station, has pre-stored a group of definitions of the PDP context. With these definitions a manufacturer of mobile stations can make default definitions to some known applications.

Network, in which case modification actions of the PDP context received over a radio link from the network function as input to the OMOC.

In addition to the definitions mentioned above the control element QMOC has an interface to transfer data with the programming interface Socket API, with IP of the IP functionalities and with PAC (Packet Classifier) functionality, which handles the classification of packets sent to the radio band.

The flow diagram in FIG. 3 illustrates on a general level an embodiment on a mobile station of a method according to the present invention. As the application is activated, the QMOC receives (point 30), for example from the programming layer Socket API, input data pertaining to said application, which data contains information about the data flows of the application and definitions about level of service connected to them. After receiving the input or inputs the QMOC defines (point 31) the QoS profiles pertaining to the different data flows of the application and activates the corresponding PDP contexts or edits the existing PDP contexts according to them. This function is explained in more detail later. When the PDP context in connection with each data flow of the application has been defined, the QMOC describes the PDP context on the IP layer into identifiers to be added to packets (point 32) and hands them over to the functionality IPe of the IP layer (point 33), which functionality is responsible for assembling IP packets. In conjunction to this, a filter to handle downlink data packets is transferred to the gateway node 3G-GGSN and another filter to handle uplink data packets is transferred to the classifier PAC in the mobile station (point 34). The filter data to the classifier PAC contains, in a method according to the present invention, information about the correspondence between said identifiers and PDP contexts. After receiving said description between data flows and identifiers, the functionality IPe of the IP layer adds an identifier according to the data flow to each IP packet assembled (point 35). On basis of the filter data received and information contained in the IP header field the classifier PAC of the mobile station can quickly and easily classify packets to a correct PDP context to the radio band (point 36).

In the following the functionality to describe the definitions pertaining to level of service of an application into PDP contexts, which functionality is connected to point 31, is studied in more detail. Windows Sockets environment of Microsoft and specifically its Generic QoS API programming interface, which offers Windows applications means for making use of the functionalities of lower protocol layers in standard mode, serves as an example. Windows Sockets version WinSock 2 contains functions, with which applications can negotiate the level of service needed with standard format WinSock API messages, which contain parameters describing the level of service. The desired level of service is given as definitions pertaining to the flow, which definitions are bound to one pair of ports by the application. In an arrangement according to the present invention the QMOC receives (directly or indirectly) information from the programming interface of the contents of the WinSock API messages and describes them into UMTS parameters, for example according to correspondences presented in the following table.

TABLE 1

The description of parameters received from Generic QoS API programming interface into QoS parameters of the UMTS system

| GQoS parameter | UMTS parameter |
| --- | --- |
| Level of Service Guarantee: | Traffic Class: |
| Guaranteed | Conversational |
| Guaranteed | Streaming |
| Controlled Load | Interactive |
| Best Effort | Background |
| Source Traffic Description: | |
| Peak bandwidth | Maximum bitrate |
| Token rate | n/a |
| Token bucket size | n/a |

TABLE 1-continued

The description of parameters received from Generic QoS API programming interface into QoS parameters of the UMTS system

| GQoS parameter | UMTS parameter |
| --- | --- |
| Latency: | |
| Delay | Transfer delay = Delay*0.5 |
| Delay variation | n/a |
| Packet sizes: | |
| MaxSduSize | SDU size information |
| MinimumPolicedSize | n/a |

The following is a presentation of a preferable embodiment of the present invention, which embodiment uses the application MULTIMED on a terminal MS and the application requires at least two different PDP contexts. Thus it is clear that packet identification cannot be based on IP address alone, but also at least the TCP/UDP ports must be known. Since TCP and UDP use the same number space, sometimes information about the type of protocol is needed. As presented above, handling TCP/UDP fields below IP layer on is not preferable on a mobile station. In the present embodiment controlling means QMOC contains a definition, which describes the information about TCP/UDP ports into the Differentiated Services (DS) field in the IP header. DS is a field that will replace the IPv4 TOS octets (Type of Service) and the IPv6 Traffic Class octets. DS is an eight-bit field in the IP header, the first six bytes of which form a DS Code Point DSCP, which defines the forwarding method (Per-Hop-Behaviour, PHB) at each IP node. After the application has started the QMOC receives the definitions of the different data flows of the application and the level of service they require via its Socket API interface. Based on the information it maintains, the QMOC describes the definitions concerning level of service of the application to PDP contexts, defines a filter and QoS profiles according to a pre-defined method and activates the corresponding PDP contexts in a known manner. When this has been completed, the QMOC gives the IP layer a command to create an IP header in such a way that the DSCP field of the header is filled to conform with the defined connection on basis of the TCP/UDP port information. For example one local code point space contains 16 different alternatives (XXXX01, where X is 0 or 1). Another local 16 bit code point space is XXXX11, so it is in principle possible to separate 16 different QoS profiles by a code point. Code points and the corresponding profiles are also maintained in the packet classifier PAC, so the PAC is, according to the IP source address and said DSCP field in the IP header, able to sort the packets to be sent in uplink direction in an essentially unique manner to be sent conforming to the desired QoS profile.

The flow diagram in FIG. 4 illustrates a method according to a first embodiment of the present invention to control the sending of a data packet being sent from a terminal. A point 40 the QMOC receives a request for connection from the application MULTIMED, the data transfer of which can best be realised by using two different levels of service. The parameter i appearing in FIG. 4 receives in this example the values 1, 2. The QMOC defines (point 41), according to the definitions it has made by aid of the received data and the user's connection forming application, that the corresponding QoS profiles are QoS1 and QoS2. At point 42 the QMOC controls the IP header to be formed in such a way that when the port number pair is TCP1, and the profile QoS1 is used, the entry DSCP1=000001 is made in the CodePoint field of the IP field, and when the port number is TCP2 and the profile QoS2 is used, the entry DSCP2=000101 is made in the CodePoint field of the IP field. The QMOC activates PDP contexts to both flows according to a known method (point 43). On basis of the value DSCP1 or DSCP2 of the DSCP field the classification functionality PAC can easily distinguish from one another packets coming from the application MULTIMED and belonging to two different data flows (point 44).

It must be noted that the embodiment presented above is an example, so the namings have been selected for illustratory purposes and the present invention is thus not restricted to the terms and choices presented. If local code points are used, these code points can only be used inside an UMTS system and they have to be converted in the gateway node 3G-GGSN according to an agreement made with a local ISP.

Some standard code points, namely AF (Assured Forwarding) and EF (Expedited Forwarding), have been defined in Internet specifications and can be used when the packets come from an external device, e.g. a laptop. If stardard code points can be used, the classification of packets can be realised also in the mobile station with the aid of these code points. Preferably a default PDP context is defined to the QMOC, according to which a packet is transmitted, when the PDP context of the packet can not, for one reason or another, be identified.

This has been a presentation of the implementation and embodiments of the present invention with the aid of examples. It is evident to a man skilled in the art, that the present invention is not restricted to the details of the embodiments presented above and that the invention can be implemented in another form without deviating from the characteristics of the present invention. The presented embodiments should be considered illuminatory but not restrictive. Thus the implementation and use possibilities of the present invention are only limited by the enclosed claims. In this way different alternative implementations of the present invention, as defined by the claims, also equivalent implementations belong to the area of the invention.

What is claimed is:

1. A method to control the PDP context of a data packet in a mobile station containing one or more applications performing packet format data transfer, in which method,
   a data packet is received from an application, which packet contains a first identifier to identify the application that has created the packet; wherein the
   input data pertaining to said application is received, which input data contains information about data flows of the application;
   on basis of said input data, a PDP context is defined for said data flows of the application;
   a second identifier indicating a data flow is added to the data packet; and
   the departing data packet is classified into a PDP context on basis of said first and said second identifier.

2. A method according to claim 1, wherein the first identifier indicates a PDP address of the application.

3. A method according to claim 1, wherein the input data pertaining to said application is received at least in conjunction with the start of the application.

4. A method according to claim 3, wherein the input data pertaining to said application is received from a programming interface of the application.

5. A method according to claim 3, wherein the information of certain applications is stored in a storage medium that is functionally connected to a mobile station; and
   the input data pertaining to said application is retrieved from a memory of the mobile station as a response to the start of the application.

6. A method according to claim 3, wherein the input data pertaining to said application is received in signalling with an external control unit (3G-GGSN).

7. A method according to claim 1, wherein different data flows of an application are identified by port pairs of the transport layer.

8. A method according to claim 3, wherein a second identifier is added in some field in an IP header.

9. A method according to claim 3, wherein a second identifier is added to the DSCP (Differentiated Services Code Point) field contained in an IP header.

10. A mobile station (MS) containing applications that perform packet format data transfer; which mobile station comprises
    a packet element (IPe) to create a data packet received from an application;
    means for classifying (PAC) to classify a data packet into the chosen PDP context on basis of a first identifier, which first identifier indicates the application that has created the packet;
    wherein the mobile station comprises a control unit (QMOC) to receive input data, which input data contains information about data flows of an application; and additionally
    said control unit (QMOC) has been arranged to define a PDP context for the data flows of the application on basis of said input data;
    said control unit (QMOC) has been arranged to indicate to the packet element (IPe) a group of second identifiers in order to indicate a data flow;
    the packet element (IPe) has been arranged to add a second identifier into the data packet according to the data flow; and
    said classifying means (PAC) have been arranged to classify a data packet into a PDP context according to said first and second identifier.

* * * * *